United States Patent [19]

Poussin et al.

[11] Patent Number: 5,238,035
[45] Date of Patent: Aug. 24, 1993

[54] EQUIPMENT FOR FILLING A CONTAINER WITH A DIVIDED SOLID PRODUCT

[75] Inventors: Bernard Poussin, Carrieres sur Seine; Daniel Lumbroso, Rueil Malmaison, both of France

[73] Assignee: Institut Francais du Petrole, Rueil Malmaison, France

[21] Appl. No.: 781,166

[22] PCT Filed: Apr. 19, 1990

[86] PCT No.: PCT/FR90/00284

§ 371 Date: Oct. 16, 1991

§ 102(e) Date: Oct. 16, 1991

[87] PCT Pub. No.: WO90/12746

PCT Pub. Date: Nov. 1, 1990

[30] Foreign Application Priority Data

Apr. 27, 1989 [FR] France ............... 89 05780
Jul. 27, 1989 [FR] France ............... 89 10287
Oct. 12, 1989 [FR] France ............... 89 13469

[51] Int. Cl.⁵ ........................................... B65G 65/32
[52] U.S. Cl. ........................................ 141/286; 141/93; 141/98; 141/392; 239/682; 414/301
[58] Field of Search ............. 141/93, 98, 286, 392, 141/234, 236; 239/663, 665, 666, 673, 682, 687; 193/29, 30; 414/301, 302

[56] References Cited

U.S. PATENT DOCUMENTS

| 1,560,800 | 11/1925 | Hoberecht | 239/666 X |
|---|---|---|---|
| 3,428,156 | 2/1969 | Charyn et al. | 141/392 X |
| 3,469,718 | 9/1969 | Felix et al. | 239/687 X |
| 3,586,246 | 6/1971 | Van der Lely | 239/665 |
| 3,599,878 | 8/1971 | Buschban et al. | 239/665 |
| 3,966,124 | 6/1976 | Sukup | 239/666 |
| 4,135,560 | 1/1979 | Eang et al. | 141/392 X |
| 4,300,725 | 11/1981 | Moherek | 141/392 X |
| 4,727,913 | 3/1988 | Bliss | 141/93 X |
| 4,821,861 | 4/1989 | Shanahan | 141/93 X |
| 4,972,884 | 11/1990 | Souers et al. | 141/286 X |

FOREIGN PATENT DOCUMENTS

| 0899420 | 7/1984 | Belgium . | |
|---|---|---|---|
| 01472285 | 7/1985 | European Pat. Off. . | |
| 0329072 | 8/1989 | European Pat. Off. | 239/682 |
| 0330413 | 8/1989 | European Pat. Off. . | |
| 0350172 | 1/1990 | European Pat. Off. . | |
| 0430927 | 6/1991 | European Pat. Off. | 239/665 |
| 0433562 | 6/1991 | European Pat. Off. | 239/665 |
| 2703329 | 8/1978 | Fed. Rep. of Germany . | |
| 3708653 | 9/1988 | Fed. Rep. of Germany | 141/93 |
| 6508550 | 1/1966 | Netherlands . | |
| 1005696 | 3/1983 | U.S.S.R. | 239/673 |
| 1495206 | 7/1989 | U.S.S.R. | 141/392 |
| 1308087 | 2/1973 | United Kingdom . | |
| 2014189 | 8/1979 | United Kingdom . | |
| 2168330 | 6/1986 | United Kingdom . | |

Primary Examiner—Henry J. Recla
Assistant Examiner—Casey Jacyna
Attorney, Agent, or Firm—Millen, White, Zelano & Branigan

[57] ABSTRACT

An apparatus for filling a receptacle with a divided solid product by a dispersion head comprises plates which rotate about an axis dispersing into the receptacle at various distances from the axis particles of the solid product which flow over the plates.

3 Claims, 4 Drawing Sheets

5,238,035

EQUIPMENT FOR FILLING A CONTAINER WITH A DIVIDED SOLID PRODUCT

BACKGROUND OF THE INVENTION

1) Field of the Invention

Generally, the filing of receptacles with solid particles (granular solids) is accomplished by transfer of the solid particles by means of a funnel and/or a cone either manually or mechanically or by pneumatic transference.

2) Background Art

As a general rule, it is of utmost interest to introduce the maximum amount of product into a given space, as much in order to reduce the cost of storage as well as for other specific reasons, such as, for example, to standardize storage or reduce the volume of air or gas in the container. The object of the present invention is to provide an apparatus which makes it possible to achieve an increase in the quantity of solid introduced into a certain volume.

Everyday storage situations relate to cereals (in silos), food products intended for consumption or for livestock, agro-alimentary products, fertilizers, chemicals, granulated plastics, pharmaceutical and/or cosmetic products, and many other divided solid material (grains or tablets or extruded granulate material, pills, agglomerates, crushed materials, etc.).

Another field of application includes receptacles or chemical reactors intended to be filled with solid particles: catalysts, adsorbents, reagents, packings, sundry fillings. In this case, it is almost always advantageous to place the maximum amount of solid product inside the reactor in order to enhance the activity thereof per unit volume and therefore to improve the efficiency and effective service life (cycle time or working life).

A suitable method resides in using the apparatus described in French Patent No. 2431449. Other apparatuses have already been described in the prior art, particularly the apparatus described in Patent DE-A-2 703 329.

SUMMARY OF THE INVENTION

An apparatus for filling a receptacle with a divided product or divided solids comprises a hopper and a motor fixed to the hopper. A substantially vertical shaft is driven by the motor and a dispersion head is connected to the shaft for rotation by the motor. The dispersion head comprises at least three substantially circular plates arranged coaxially and being substantially parallel. The plates are disposed one below another with the radius of each plate steadily decreasing from the top plate to the bottom plate. A series of at least two and preferably at least three substantially concentric tubes of cylindrical form are stacked coaxially from a highest to a lowest, and are demountable and adapted for sliding movement.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
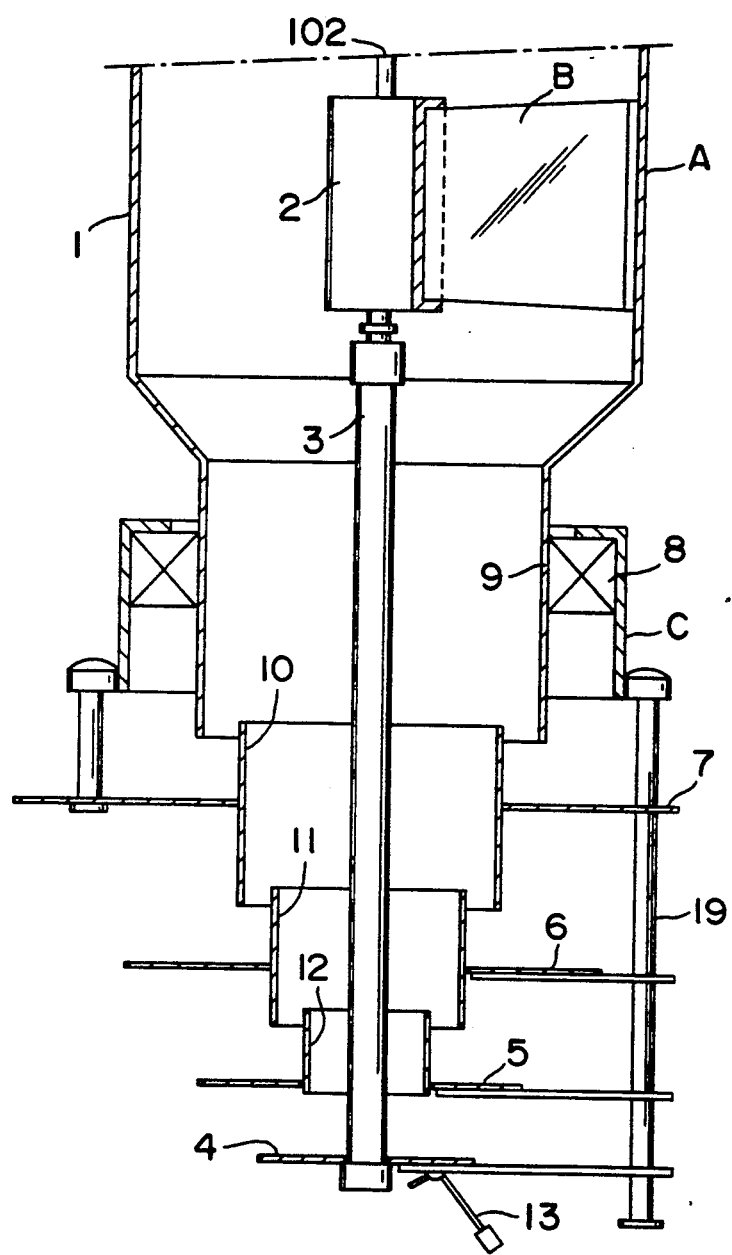
FIG. 1 is a side elevation of a hopper configured in accordance with the principles of the instant invention.

FIG. 1 illustrates a hopper configured in accordance with the invention. The apparatus consists of a fixed feed hopper (1), preferably having in its center a pneumatic motor (2) possibly supplied with gas (air, for example, for its operation). The motor (2) is attached to the hopper by a flange B and A is the hopper. The motor (2) drives a shaft (3) which produces rotation of a dispersion head C to which the shaft is attached. This dispersion head C comprises at least two plates and preferably at least three or four plates. FIG. I shows four plates (4), (5), (6) and (7) which are generally rigid with one another, for example via a support, for example the rod (19) to rotate together.

Powdered solids flow by gravity downwards through a series of tubes (at least two tubes and preferably at least three or four) which are concentric, their diameter diminishing a downwards direction. Thus, the solids flow firstly into a tube (9) and then into the coaxial concentric tubes (10), (11) and (12) of increasingly smaller diameter. These tubes may be demountable and adapted to slide if necessary and they are characteristic of the present invention.

At each tube change, at least a part of the granulate solids falls onto one of the plates (7), (6), (5) and (4). The plate (7) rotates about the tube (10) and is supplied by the down tube (9) preferably fixed and connected itself to the bearing (8). The other tubes for downwards passage of solids (10), (11) and (12), fixed or adapted for preferably a slight rotary movement and of increasingly smaller diameter, create concentric annular spaces allowing the grains or granular solids, respectively, to feed the plates (6), (5) and (4). The plates (6) and (5) rotate with respect to tubes (10), (11) and (12). The plate (4) rotates about the shaft (3). Under the effect of centrifugal force, the solid particles are thrown into the space to be filled. The plates (7), (6), (5), (4) may (see FIG. 2) be fitted with at least one deflector. When a plurality of deflectors are used, they may be identical or different, flexible or hard (such as (14), (15), (16) in FIG. 2, the use of which favors dispersion and projection of grains).

Figure 2:
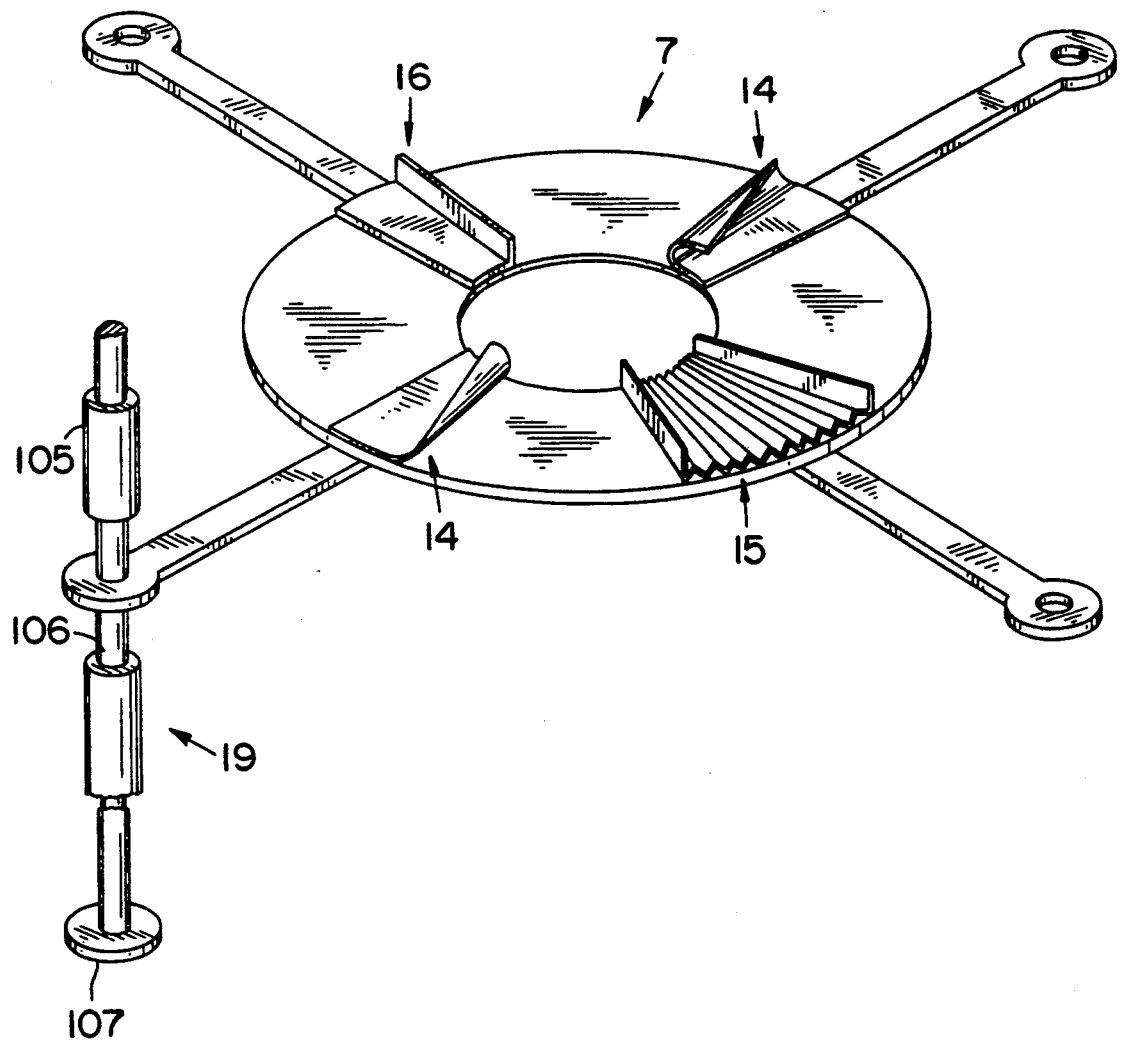
FIG. 2 is a perspective view of a plate utilized with the hopper of FIG. 1.

FIG. 2 shows a plate, in this case the plate (7), in a perspective view. These deflectors will vary in shape and be adequate and adapted to the shape of the powdered particles. The radii of the plates may be regulable, that is to say, may be increased or reduced in order to create or increase the width of the ring of solids thrown into the bottom of the receptacle (for example, rings E1, E2, E3 and E4 in FIG. 4). Thus, plates are fitted which are easily adaptable or which can be modified for preliminary filling tests. The plates may have a continuous or an intermittent surface.

Figure 3:
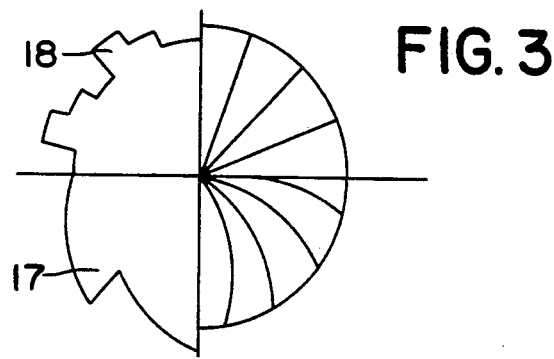
FIG. 3 is a planar view of a plate illustrating various configurations.

FIG. 3 shows a plate in the four following situations: deflector (18) in FIG. 2, deflector (16) in FIG. 2, plate with straight or curved lines, plate with an undulating surface (for better attachment of the solids).

Figure 4:
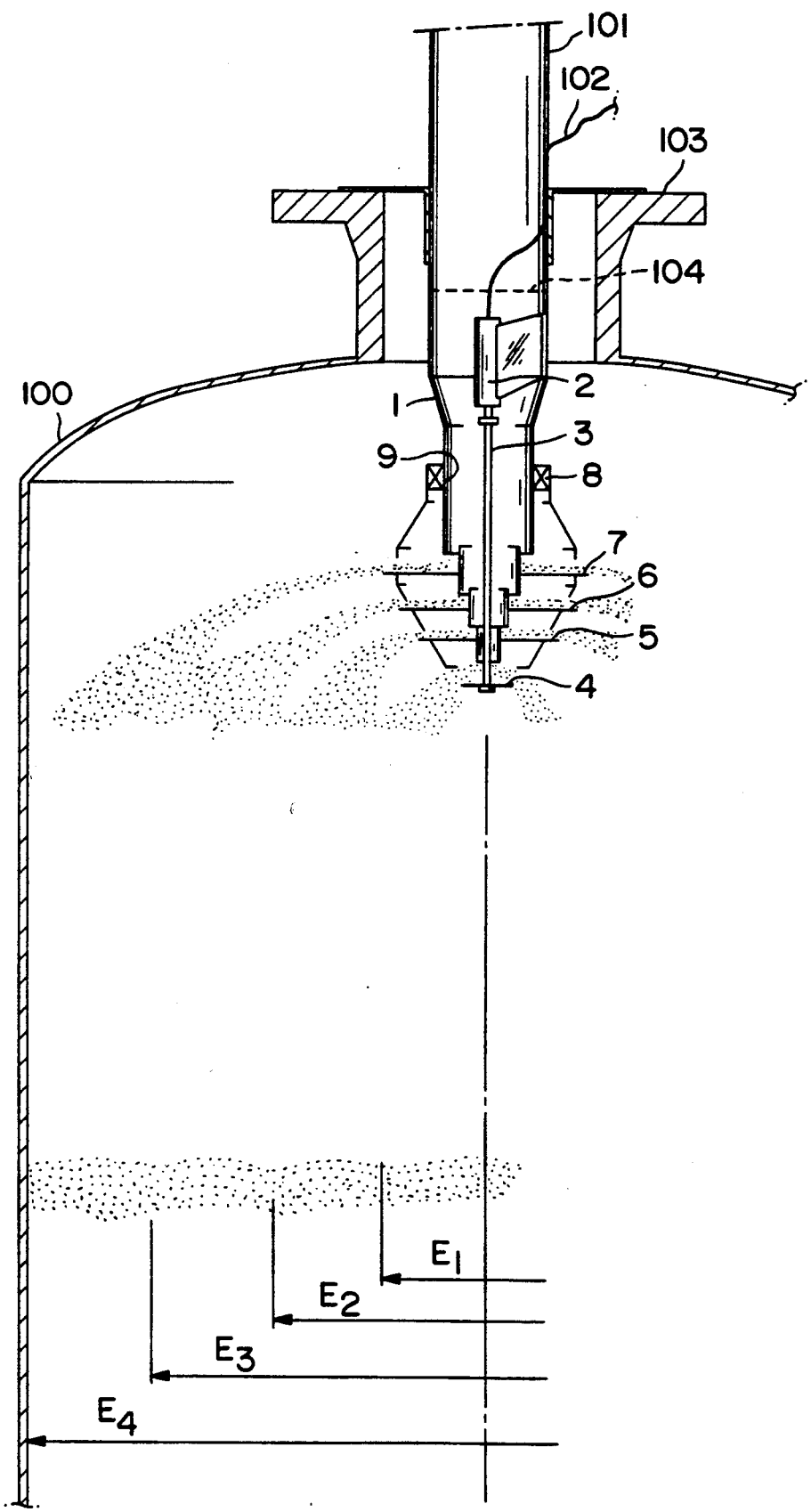
FIG. 4 is a side elevation showing the hopper of FIG. 1 in combination with a receptacle.

The bottom plate ((4) in FIGS. 1 and 4) may be equipped with an automatic flow-regulating system (with automatic opening) which adapts to the speed of rotation or filling (feeder heads (13) in FIG. 1). The same principle may be applied to the other plates.

The invention relates to an apparatus for filling a receptacle with a divided product or divided solids comprising (see FIG. 1):
a hopper (1) provided with a motor (2) rigid with the hopper, rotation or filling (feeder heads (13) in FIG. 1).

The same principle can be applied to the other plates.

In short, the invention relates to an apparatus for filling a receptacle with a divided product or divided solids and comprising the structure shown in FIG. 1:
in which a hopper (1) is fitted with a motor (2) rigid with the hopper,
a substantially vertical shaft (3) is driven by type motor and
a dispersion head is caused to rotate by the motor.

The dispersion head comprises at least two plates and preferably at least three or four, such as plates (7), (6), (5) and (4), substantially parallel and coaxial and substantially circular, disposed one below another. The radius of each plate is less from the top plate to the bottom plate. A series of at least two and preferably at least three or four tubes such as tubes (9), (10), (11) and (12) of substantially concentric cylindrical form are stacked coaxial are possibly demountable and adapted for sliding movement. The divided solids flow by gravity in the tubes. Each cylinder has its bottom end above a plate and each cylinder, except the highest, has its upper end substantially at the level of the bottom end of the cylinder situated above. The diameter of each tube is less than the diameter of the tube which surmounts it and greater than the diameter of the tube which it surmounts. Each plate thus being associated with a tube about which it rotates with the bottom plate rotating about the shaft (3). A part of the divided solids flows from each tube into the tube immediately underneath and another part of the solids flows from each tube onto the plate and onto the top of which it discharges. The divided solids which fall onto this plate are subjected to a rotary movement due to rotation of the plate onto which the solid materials fall. Centrifugal force generated by the rotation of the plates make it possible to eject the solids at different distances from the axis of the shaft. The distances being substantially proportional to the radius of the plate from which the solids have been thrown into the enclosure being filled.

It should be noted that, in FIG. 2, there is also shown for the plate (7) the rod (19) which is rigid with the plate (7) and which in particulate comprises a partition (105), a screw-threaded rod (106) and the support (107) on which the apparatus is able to rest on the ground.

The speed of rotation of a plate may vary between 15 and 780 revolutions per minute.

FIG. 4 likewise illustrates the invention. It shows a receptacle (100) which is filled with powdered solids by means of the apparatus according to the invention. The duct (101) makes it possible to introduce granular solids into the apparatus according to the invention. The neck (103) (or reactor flange) makes it possible to fix the apparatus according to the invention into the upper part of the enclosure (100). Generally, a grill (104) can facilitate the flow of solids towards the apparatus according to the invention. This FIG. 4 clearly shows that each plate (or stage) fills its own ring in the bottom of the receptacle, which it thus gradually fills in an homogeneous fashion.

The advantages of such a system are essentially as follows:
compactness,
simplicity,
intrinsic safety (cessation of the pneumatic fluid stops rotation of the plates and therefore the flow),
ventilation of the medium by the shape of the deflector plates and elimination of fines,
homogeneity of filling and high volume gain,
wide range of flows possible for one and the same apparatus thanks to the flexible diameter $\phi$ of the hopper and plate,
easy monitoring of speed of rotation,
control of flow independent of the speed of rotation, and
continuous flow variation facility.

The design of the system makes it possible to accept loading with high density divided solids (such as heavy catalysts of density between 2 and 4). Furthermore, dusty catalysts can be loaded without human presence inside the reactor.

Thus, there are filling gains of around 10 to 35% compared with prior art systems.

The invention is particularly suitable for supplying catalyst to reforming reactors, for the production of aromatic hydrocarbons from various charges, for example $C_2-C_3$, $C_2-C_3$, $C_2-C_7$, $C_5-C_7$, $C_2-C_{10}$ etc. . . with reforming type catalysts or with zeolite-based catalysts of the MFI type which may or need not contain various promoters such as for example gallium.

In the present invention, it has likewise been discovered that the distribution of the catalyst within the receptacle was more regular if, in the apparatus according to the main application, at least three plates of elliptical shape are used.

Figure 5:
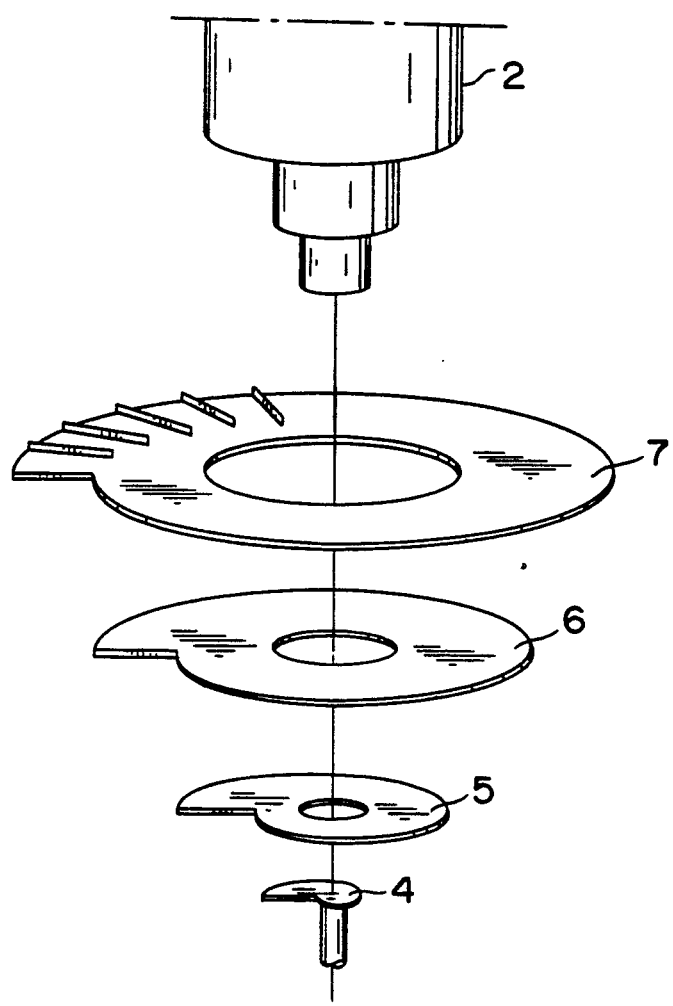
FIG. 5 is an exploded perspective view of an embodiment with plates of a selected configuration.

FIG. 5 illustrates the equipment.

Each plate 4, 5, 6, 7 (supplied by a motor (2)) is of spiral shape. The spiral may be continuous in form. Continuity will occur from one plate to another; as indicated earlier, for an intermediate plate, the shortest radius of the spiral may correspond to the longest radius of the spiral of the plate underneath it. The longest radius corresponds to the shortest radius of the spiral of the plate above it.

The plates may be provided with blades (tubes or profiled members in particular), for example flat radial blades or incurvate radial blades.

FIG. 5 illustrates an exploded view of the plates.

Figure 6:
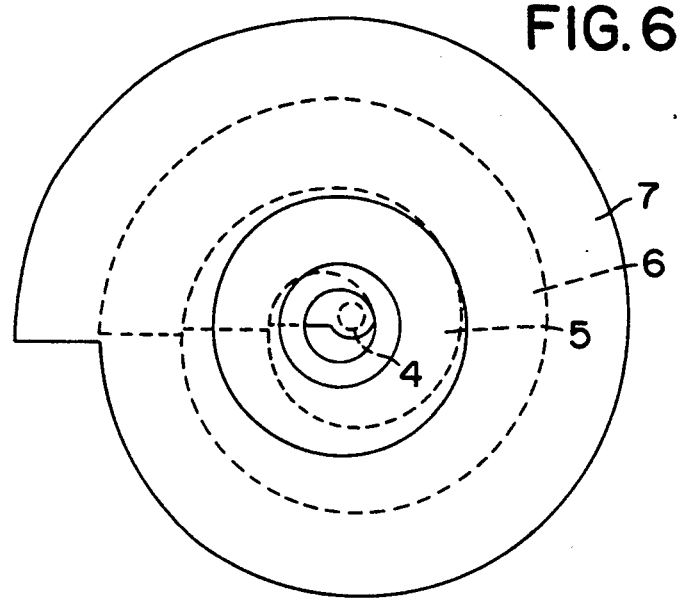
FIG. 6 is a top view of the plates of FIG. 5 superimposed.

FIG. 6 illustrates an aerial view of the plates showing the continuous aspect of one single spiral.

| Product | Form | Dimensions mm | Density of filling in bulk in kg/l | Density obtained according to the invention in kg/l | Volume gain |
| --- | --- | --- | --- | --- | --- |
| Reforming catalyst | extrudate | $\phi = 1.2$<br>$l = 4$ to $6$ | 0.65 | 0.765 | 22% |
| Cloverleaf catalyst | extrudate | $\phi = 1.5$<br>$l = 7$ to $10$ | 0.58 | 0.73 | 26% |
| Hydrogenation catalyst | balls | $\phi = 2$ to $4$ | 0.70 | 0.77 | 10% |
| PVC granules | extrudate | $\phi = 3$ to $4$<br>$l = 4$ to $6$ | 1.20 to 1.93 | 1.5 to 2.3 | 19 to 25% |
| Fertilizer | granules | $\phi = 1.5$ to $4.5$ | 0.85 to 1.05 | 0.98 to 1.2 | 15 to 16% |
| Rice catalyst | long grain | $\phi = 1.5$<br>$l = 8$ to $9$ | 0.75 | 0.94 | 25% |
| Wheat | short grain | $\phi = 3$<br>$l = 6$ to $7$ | 0.76 | 0.875 | 15% |
| Oats | long grain | $\phi = 2$ to $3$<br>$l = 8$ to $10$ | 0.56 | 0.69 | 23% |
| Sunflower | convex flat pointed grain | convex section<br>$6 \times 8$<br>$l = 10$ to $12$ | 0.34 | 0.39 | 15% |
| Heavy catalysts | | | 2.1 to 3.5 | | 15 to 25% according to shape |

The result is a reduction in the fraction of intergranular volume of 20 to 50% and therefore an increase in storage capacity to which can be added a reduction in the volume of gas contained in the medium and if applicable a reduction in the consumption of gas needed to render the medium inert.

We claim:

1. An apparatus for filling a receptacle with a divided product or divided solids comprising:
   a hopper,
   a motor fixed to the hopper,
   a substantially vertical shaft driven by the motor,
   a dispersion head connected to the shaft for rotation by said motor, the dispersion head including at least three substantially circular plates, each of a different radius, the plates being mounted coaxially with respect to the shaft with one of the plates being fixed to the shaft and the other plates being coupled to the plate fixed to the shaft, the plates being arranged in parallel, spaced relation with respect to one another, with the plate having the largest radius being proximate the hopper, the plate having the smallest radius being most remote from the hopper and plates of other radii being disposed therebetween in descending order according to the size of the radii thereof,
   the dispersion head further including a plurality of tubes having tops and bottoms and being of different diameters, each tube being disposed between the shaft and the plate in descending order according to the size of the diameters thereof with the bottom of each tube terminating above the plate disposed directly below that tube, whereby as the dispersion head is rotated by the shaft the plates are rotated about the tubes and a portion of the divided solids flows through each tube into the tube immediately underneath and another portion of the solids flows from each tube onto the plate immediately therebeneath and is discharged therefrom, the divided solids which fall onto the plate being subjected to centrifugal force generated by the rotation of the plates to eject the divided solids at different distances from the shaft, which distances are substantially proportional to the radius of the plate from which the solids have been ejected into the receptacle being filled.

2. The apparatus of claim 1 in which the concentric tubes are fixed with respect to the hopper.

3. The apparatus of claim 1 in which at least one plate is provided with at least one deflector.

* * * * *